US007460250B2

(12) United States Patent
Keightley et al.

(10) Patent No.: US 7,460,250 B2
(45) Date of Patent: Dec. 2, 2008

(54) LASER TRIANGULATION SYSTEM

(75) Inventors: John Keightley, Langley (CA); Adriano Cunha, Delta (CA)

(73) Assignee: 3DM Devices Inc. (CA)

( * ) Notice: Subject to any disclaimer, the term of this patent is extended or adjusted under 35 U.S.C. 154(b) by 537 days.

(21) Appl. No.: 10/971,070

(22) Filed: Oct. 25, 2004

(65) Prior Publication Data
US 2005/0111009 A1 May 26, 2005

Related U.S. Application Data

(60) Provisional application No. 60/513,554, filed on Oct. 24, 2003.

(51) Int. Cl.
*G01B 11/24* (2006.01)
(52) U.S. Cl. .................. 356/625; 356/602; 250/236
(58) Field of Classification Search ......... 356/602–625, 356/394, 243.1, 243.4; 250/559.21, 559.24, 250/559.27, 560–561, 234–236; 382/154, 382/258, 291; 435/653, 664, 679
See application file for complete search history.

(56) References Cited

U.S. PATENT DOCUMENTS

| 4,628,469 | A |   | 12/1986 | White |
|---|---|---|---|---|
| 4,741,621 | A | * | 5/1988 | Taft et al. .................... 356/606 |
| 4,801,207 | A | * | 1/1989 | Williams .................... 356/606 |
| 4,979,815 | A | * | 12/1990 | Tsikos ........................ 356/3.06 |
| 4,993,835 | A | * | 2/1991 | Inoue et al. ................. 356/607 |
| 5,164,579 | A |   | 11/1992 | Pryor et al. |
| 5,289,261 | A | * | 2/1994 | Yogo et al. .................. 356/611 |
| 5,362,962 | A |   | 11/1994 | Barborak et al. |
| 5,557,410 | A | * | 9/1996 | Huber et al. ................ 356/604 |
| 5,625,446 | A |   | 4/1997 | Bedard |
| 5,811,827 | A |   | 9/1998 | Pryor et al. |
| 5,812,269 | A |   | 9/1998 | Svetkoff et al. |
| 5,815,272 | A |   | 9/1998 | Harding |
| 6,369,401 | B1 | * | 4/2002 | Lee ........................ 250/559.21 |
| 6,529,627 | B1 | * | 3/2003 | Callari et al. ............... 382/154 |
| 6,839,144 | B2 | * | 1/2005 | Okada et al. ................ 356/606 |

OTHER PUBLICATIONS

Beraldin, et al., "Extension of the Dynamic Range of Active Laser Range Finders", Illumination and Image Sensing for Machine Vision III, SPIE vol. 1005 Optics (1998) p. 164-168.
Naidu, et al., "A Comparative Analysis of Algorithms for Determining the Peak Position . . . ", Proc. of British Mach. vision Conf. Univ. of Gaslgow, BMVC91, (1991) p. 217-225.

(Continued)

*Primary Examiner*—Sang Nguyen
(74) *Attorney, Agent, or Firm*—Vermette & Co.; Clifford W. Vermette; Denis R. O'Brien

(57) ABSTRACT

A method for measuring the range to multiple points on a surface by projecting a line of light onto the surface, imaging said line of light onto a photodetector, computing the centroid of said line of light, computing quality factors for each computed centroid and encoding the quality factors as one or more bits in the centroid value, transmitting said centroid value to a data receiver, and computing the range to the surface for each point corresponding to each centroid value.

42 Claims, 10 Drawing Sheets

OTHER PUBLICATIONS

Svetkoff, et al. "Imaging Geometry and Error Sensitivity . . . ", Three Dimensional and Unconventional Imaging for Industrial Inspection . . . , SPIE vol. 2599 (1995) p. 106-119.

Blais, et al. "Real Time Numerical Peak Detector", Signal Process., 11(2) Ottawa, ,Canada (1986) p. 145-155.

* cited by examiner

Untagged Data

Tagged Data

Line profile

Positive differential indicators

Negative differential indicators

Resolved Gating pulses

After wide feature filter

After peak differential extraction

LASER TRIANGULATION SYSTEM

RELATED APPLICATION

This application claims the benefit of previously filed Oct. 24, 2003, Provisional Patent Application No. 60/513,554.

FIELD OF THE INVENTION

The present invention relates to techniques to improve the quality of measurements made with laser triangulation sensors.

The first technique adds quality factors to each data point at the time of acquisition and uses these quality factors to adjust real time operating settings. These quality factors can also be used in later processing operations to select high quality data from the complete data set.

BACKGROUND OF THE INVENTION

A laser triangulation sensor provides dimensional information about an object placed in the path of a sheet of laser light.

Referring to FIG. 1, a camera 10 placed at an oblique angle to the sheet of light 20 formed from laser 25 acquires an image 30 showing the location of the laser line on the surface of the object. In a calibrated system the location of a point x, y 40 in the camera image 30 is uniquely associated with the X,Y position 50 of the corresponding point on the surface of the object. In a typical system there are several hundred points on each laser line corresponding to the number of video lines in the camera. If the sensor system or object is translated in a controlled manner, then a complete profile of the surface of the object can be assembled from successive line scans.

The laser light sheet 20 and the camera axis form two sides of a triangle, the third being the baseline 60 between the laser and the camera—hence the term Triangulation Sensor.

The laser sheet 20 may be formed by rapidly translating a single spot with a moving mirror, or using cylindrical optics in the laser path to spread the beam in one direction to form a line. The first, dynamic system, has the advantage of high incident laser power in a single spot, but suffers form mechanical complexity, whereas the seconds static configuration, has no moving parts but can suffer from lack of incident laser power as the beam is spread over a long line and the inability to dynamically modify the intensity of laser power along the laser line.

In either configuration, the camera image of the laser on each video line comprises an intensity profile typically having a base width of 6 to 20 pixels and a height of ⅓ to full scale. The centroid of this intensity profile is the 'x' value of the x,y coordinate, the 'y' value is the number of the video line on which we are operating on. Numerous techniques exist for calculating the centroid of the laser line, including simple ½ threshold, multiple thresholds, area calculation and differentiation followed by zero crossing detection.

In all cases, some or all of the following conditions regarding the form of the pulse are assumed to be valid—

It is not clipped at peak height

It is symmetric

It has reasonable amplitude above any noise or background

It is not overly wide or narrow

If these conditions are met, then the accuracy in determining x, the centroid, can be $1/16^{th}$ pixel or better before other considerations such as speckle noise, system opto-mechanical stability, and calibration accuracy begin to be more dominant sources of error. However, if one or more of these conditions are not met, then system resolution and accuracy start to degrade in an indeterminate manner.

The two dominant dynamic conditions that affect system performance are the presence of clipping of the peak and inadequate signal amplitude above the background. The first is generally caused by too high an exposure for the surface and the other too low. The extent of this problem is several orders of magnitude as described in U.S. Pat. No. 5,811,827, issued Sep. 22, 1998, to Pryor et al., which is incorporated herein by reference as though fully set forth.

The problem can be simply stated as the system exposure should be such that the centroid peak falls within acceptable levels.

This is not a severe requirement in a dynamic laser triangulation system as the intensity of the reflected laser spot can be continually monitored and the incident laser power varied in a closed servo manner to maintain more or less constant peak heights. Fast response control circuits are required and there will always be some residual step response error if the surface exhibits abrupt reflectance or range changes.

In contrast, a static laser triangulation system has a basic limitation in that the intensity of the laser cannot be varied along the line length, only temporally for the whole line from scan to scan. It is thus impossible to provide optimum exposure conditions for many real objects at all points along the line and compromises or multiple exposures are required.

To our knowledge, current system designs do not address this issue. There are discussions about optimising system setup for best response, minimising spot size to avoid the effect of reflectance changes, providing large dynamic response detectors and post processing of Point Cloud data to remove outliers and erroneous data points, but no attempt to address the fundamental exposure problem.

Current static systems deliver centroid data when some or all of the error sources listed above are present and there are no cues provided to alert the user that the data may be suspect.

Accordingly, it is an object of the present invention to provide a laser triangulation system that addresses the disadvantages of the prior art discussed above.

SUMMARY OF THE INVENTION

A method for measuring dimensions of an object, the method comprising the steps:

providing a sensor head having a laser line generator and a photodetector;

projecting a line of laser light from the generator onto the object;

detecting an image of the line reflected from the object;

detecting an image of the line reflected from the object;

for each point in the image:
  i) generating a centroid;
  ii) generating a quality factor for the centroid, wherein said quality factor is indicative of the quality of the centroid; and
  iii) encoding the centroid and the quality factor in a centroid value;

transmitting the centroid values from the sensor head;

receiving the centroid values;

decoding the centroid values into the centroids and quality factors;

comparing the quality factors to quality criteria;

selecting from the centroids one or more selected centroids based on the comparison;

for each selected centroid computing a range to the object.

In an alternate embodiment the invention is a method for measuring the dimensions of an object, the method comprising the following steps:

provide a sensor head having a laser line generator and a photodetector projecting onto the object a first line of laser light;

detecting an image of the first line;

projecting onto the object a second line of laser light;

detecting a second image of the second line;

for points in the first image:
  i) generating a first centroid;
  ii) generating a first quality factor for the first centroid, wherein the first quality factor is indicative of the quality of the first centroid;
  iii) encoding the first centroid and the first quality factor in a first centroid value;

for points in said second image:
  i) generating a second centroid;
  ii) generating a second quality factor for the second centroid, wherein the second quality factor is indicative of the quality of the second centroid;
  iii) encoding the second centroid and the second quality factor in a second centroid value;

wherein the first centroid values correspond to one of the second centroid values;

transmitting the first and second centroid values from the sensor head;

receiving the first and second centroid values;

decoding the first and second centroid values into the first and second centroids and the first and second quality factors;

comparing the first quality factors to the second quality factors;

selecting centroids based on the comparison of the quality factors;

for each selected centroid computing the range to the object.

In an alternate embodiment the invention is a method for measuring dimensions of an object, the method comprising the following steps:

providing a sensor head having a laser line generator and a photodetector;

projecting a line of laser light onto the object;

detecting an image of the line;

for points in the image:
  i) generating a centroid;
  ii) generating a quality factor for the centroid, wherein the quality factor is indicative of the quality of the centroid; and
  iii) encoding the centroid and the quality factor in a centroid value;

transmitting the centroid values from the sensor head;

receiving the centroid values;

decoding the centroid values into the centroids and quality factors;

comparing the quality factors to quality criteria;

for each centroid computing the range to the object; and displaying a graphic representation of the ranges, said centroids, and/or the said quality factors.

In an alternate embodiment the invention is a method for optimizing exposure in a laser triangulation system, the method comprising the following steps:

providing a sensor head having a laser line generator and a photodetector;

projecting a line of laser light onto an object;

detecting an image of the line reflected from the object;

for points in the image:
  i) generating a centroid;
  ii) generating a quality factor for the centroid, wherein the quality factor is indicative of the quality of the centroid; and
  iii) encoding the centroid and the quality factor in a centroid value;

transmitting the centroid values from the sensor head;

receiving the centroid values;

decoding the centroid values into the centroids and the quality factors;

comparing the quality factors to quality criteria;

varying either the power of the line of laser light or the an exposure of the image in response to the comparison of the quality factors to the quality criteria.

The quality factor can be used to provide feedback to the user by indicating the quality of the centroid calculation according to user specified criteria. For example, the quality factor can correspond to exposure and can be used to adjust the exposure for the next scan. Alternatively, the quality factors can be used to automatically adjust the position of a range of exposures.

One or more artifacts of known size can be positioned at fixed locations in the field of view of the sensor(s) such that they are scanned on every scan. The measurement data from the scanned artifact can be used to correct for any change in position or geometry of the sensor with respect to the fixed location of the artifact(s). The measurement data from the scanned artifacts) can be used as a reference plane on every scan to permit differential measurements between the artifact(s) and the object.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Quality Factors

The quality factors attached to each centroid value provide cues to alert a user that the data may be suspect.

The quality factors are determined as follows.

In the calculation phase on each video line, extra data is available to describe the 'quality' of the centroid pulse.

In its simplest form, this is just whether the pulse height is within acceptable levels.

Other centroid quality information can include pulse width at the base or half height, total power in the pulse, or the degree of symmetry present in the pulse.

More advanced quality calculations can look at adjacent video lines and provide the degree of correlation to centroids in the 'y' direction, or identify more than one candidate centroid on the same line and report these as secondary choices.

The simple quality factors can be encoded in spare bits in the 16 bit centroid data, but the more advanced factors require the addition of an extra byte (S bits).

The quality factors are used in the system in either real time or post acquisition operations.

Real Time Usage

The quality factors can be used to provide immediate feedback to the user via color coding of the centroid data display. This provides a strong indication of system performance and whether the current exposure settings are set correctly or either too high or two low.

The quality factors can be used to provide a means to automatically set the system exposure to the optimum setting for acquiring the maximum number of valid data points The quality factors can be used to provide a means to identify and control a range of exposure bands through which the system automatically cycles during successive scans. (see section below—Auto Exposure Banding)

Figure 1:
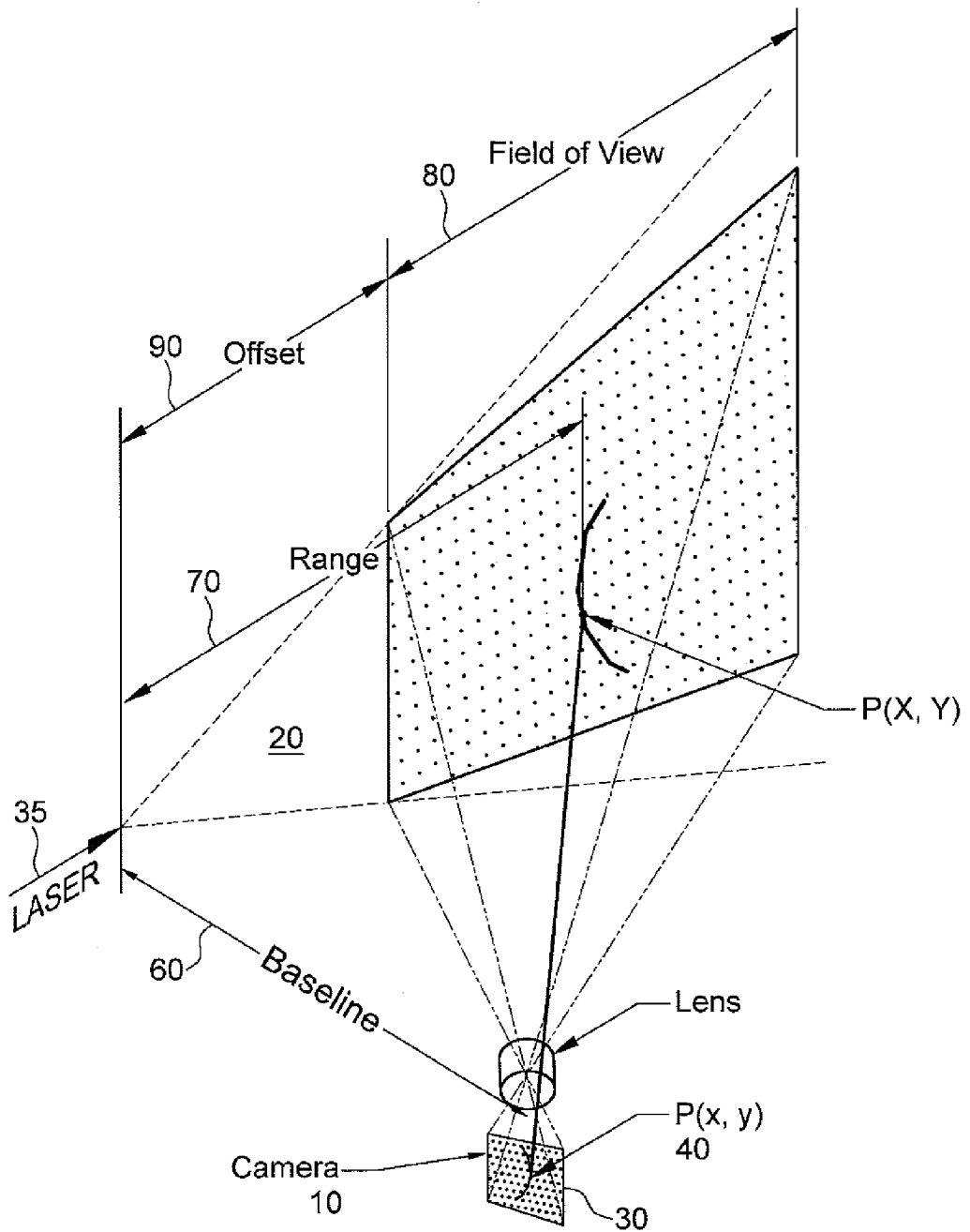
FIG. 1 is a schematic diagram of a laser triangulation system.
Figure 2:
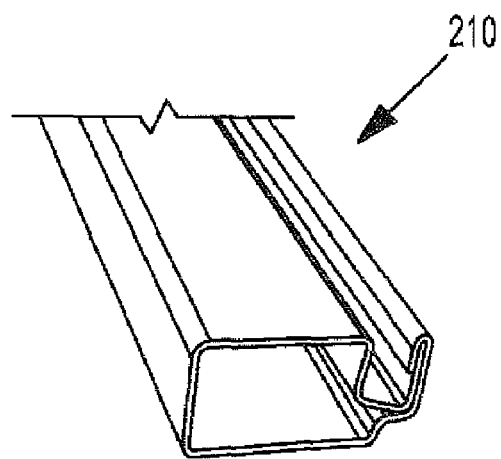
FIG. 2 is an aluminum roll-formed part to be measured.
Figure 3:
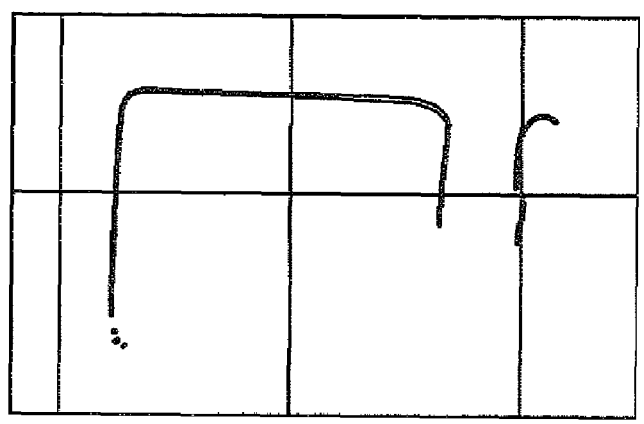
FIG. 3 shows a display of centroid measurement data of the part without quality factors of FIG. 2.
Figure 4:
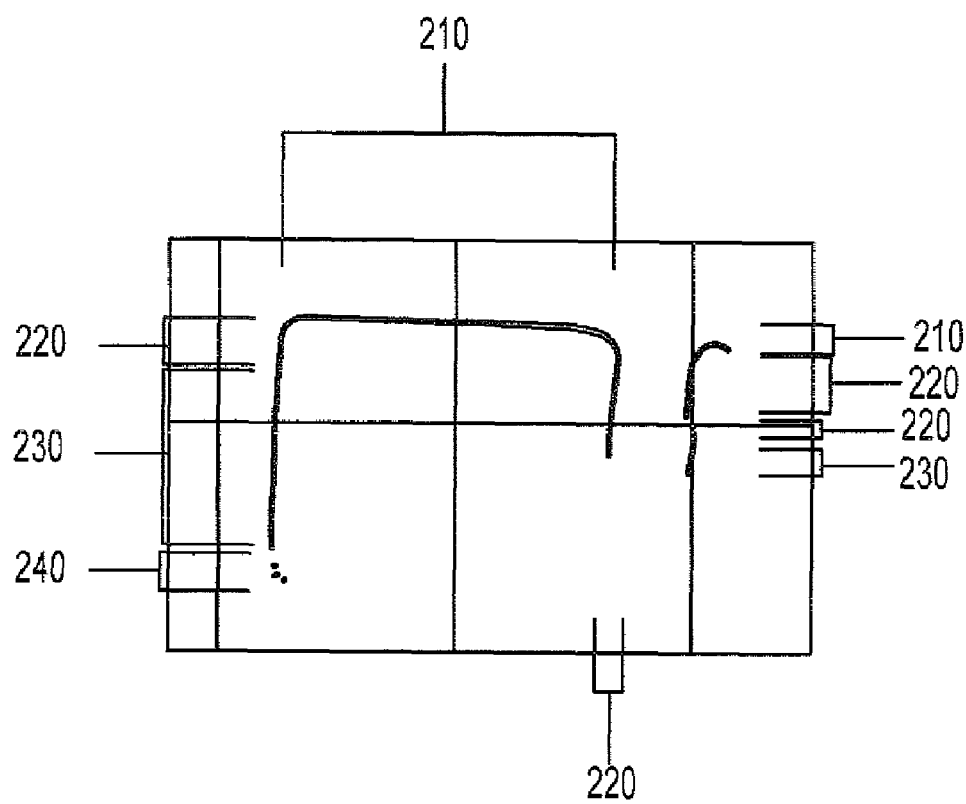
FIG. 4 shows a display of centroid measurement data of the part of FIG. 2 with quality factors.

The real time color coding is shown in FIGS. 2-4. FIG. 2 shows the actual part 200, FIG. 3 just the raw centroid data, and FIG. 4 the color coded centroid data. The red portion 210 indicates overexposure, white portion 220 indicates high exposure, green portion 230 indicates good exposure, and blue portion 240 indicates low exposure.

Centroid Calculation

The following describes a new method of calculating the centroid of a pulse from digital binary pixel data. This method requires less resources than that described in U.S. Pat. No. 4,628,469, but still maintains excellent accuracy. The final equation involves only one division and uses only first sums and subtractions and is essentially based on simple integrals. These resource savings make implementation in logic much less costly.

The following details the equation with the example of a fairly symmetrical gaussian pulse. However it can be shown that it is still equally valid as compared to existing equations on asymmetrical pulses. The equation only falls off with pulses that contain cavities.

BACKGROUND

Figure 5:
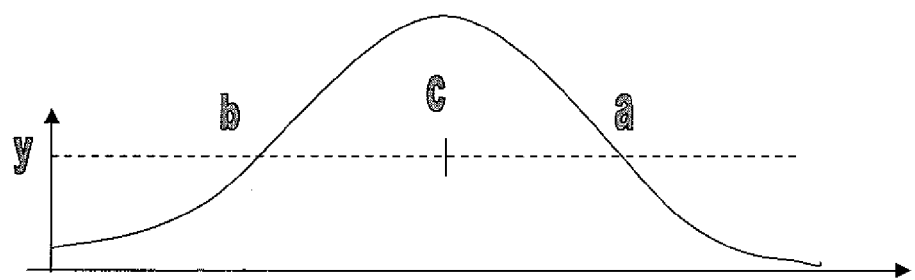
FIG. 5 is a graph depicting a method of centroid calculation.

1) Referring to FIG. 5, one method for calculating the center of a pulse involves using only a single threshold, y. If the first x-intercept of the pulse at this threshold is b and the last x-intercept is a, then the centroid equation is:

$$C=(a-b)/2+b$$

Which can be re-written as $2c=a+b$

Of course this method has the drawback that it is at most 0.5 pixel accurate when dealing with binary pixel data from a camera.

Figure 6:
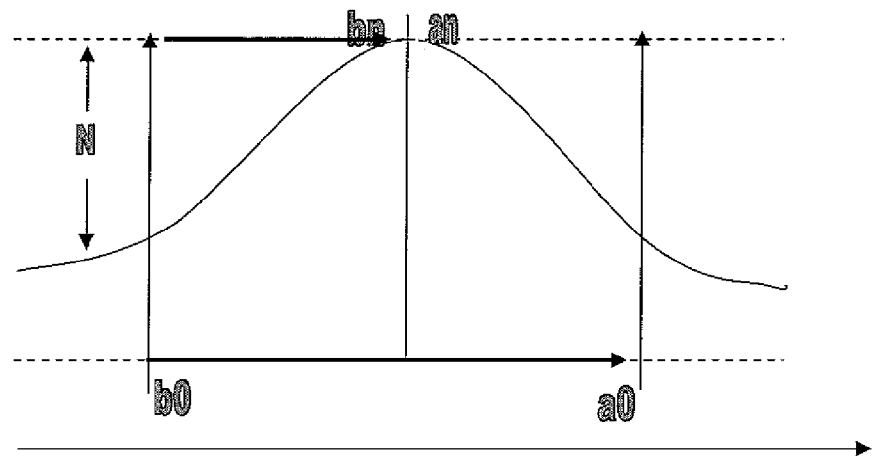
FIG. 6 is a graph depicting a method of centroid calculation.

2) Referring to FIG. 6, the above equation can be extended to N levels by integrating. However, a peak detector must be used to locate the x-intercept of the highest point of the pulse. The highest point determines the upper threshold n and therefore the upper bound on the integral. The lower threshold can be determined by several methods such as dynamic thresholding (rolling average that calculates local thresholds on a per pixel basis). b0=first x-intercept at threshold0 a0=last x-intercept at threshold0
bn=first x-intercept at thresholdn
an=last x-intercept at thresholdn
with an=bn in this diagram.

Figure 7:
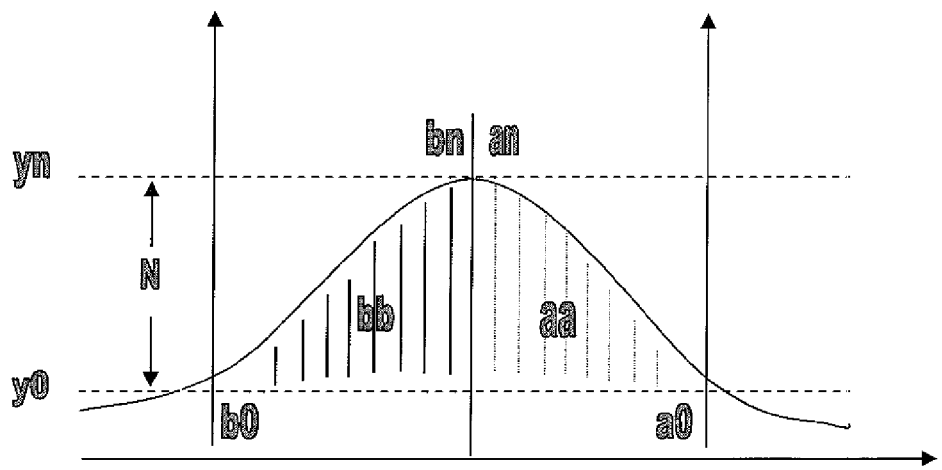
FIG. 7 is a graph depicting a method of centroid calculation.
Figure 8:
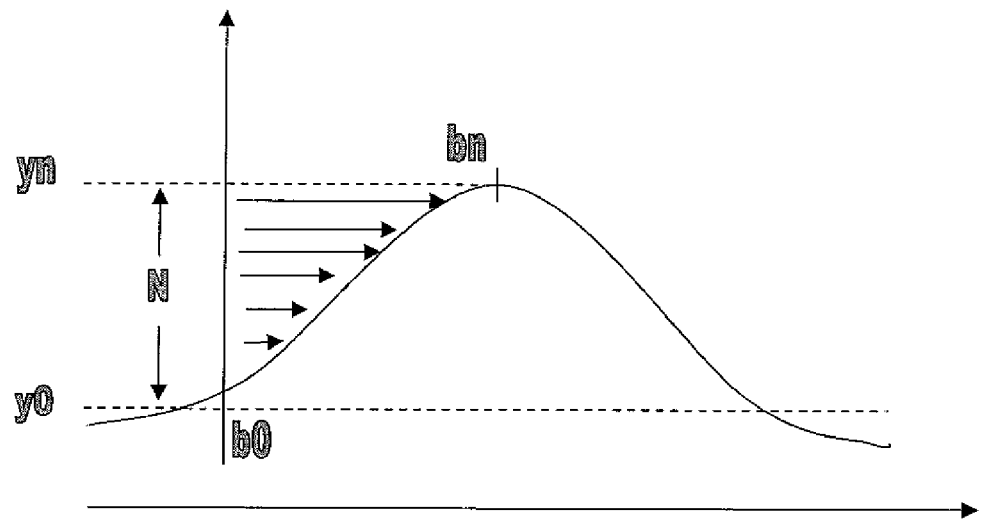
FIG. 8 is a graph depicting a method of centroid calculation.

In FIG. 7 the bb represents the area between the leading edge of the pulse and the peak intercept. The area, bb, is found by summing all the binary pixel values (y values) for the pixels from x=0 to x=bn. Similarly the area aa represents the area between the peak intercept and the trailing edge of the pulse and is found by summing all the binary pixel values (y values) from pixel an to pixel a0.

$$N=\text{upper threshold}(yn)-\text{lower threshold}(y0)$$

i) Referring to FIGS. 7 and 8, the leading curve of the pulse can then be defined by the following area $$Nbn-bb$$

where bb is the sum of all the binary pixel values (y values) from x=b0 to bn

Figure 9:
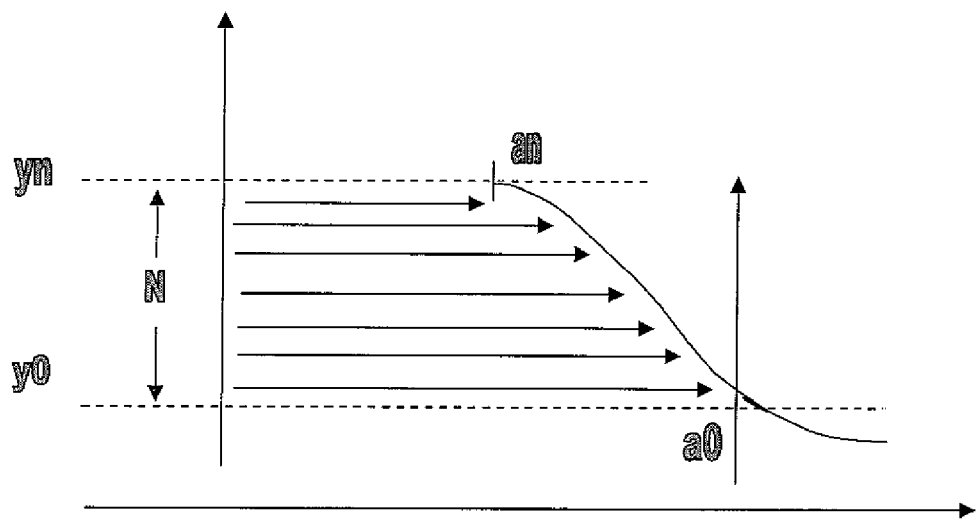
FIG. 9 is a graph depicting a method of centroid calculation.

This corresponds to all the x-intercepts from b0 to bn ii) Similarly, referring to FIGS. 7 and 9, the trailing curve is defined by the following area:

$$Nan+aa$$

Where aa is the sum of all the binary pixel values (y values) from x=an to a0

This corresponds to all the x-intercepts from a0 to an The centroid equation from before for a single intercept was $$2c=a+b$$

Integrating both sides of this equation for N thresholds and substituting the above values gives the result $$2cN=Nan+aa+Nbn-bb$$

$$\text{or } 2c=an+bn+(aa-bb)/N$$

where an=bn if the peak is defined as a single point. This equation therefore essentially averages all the discrete centers to determine the final true center.

3) The equation $2c=an+bn+(aa-bb)/N$ has several advantages over existing methods.

The final division by 2 is easily accomplished in binary logic by right shifting and therefore has virtually no overhead. As in the method described in U.S. Pat. No. 4,628,469, there is only one main division; in this case by N. The divisor, N, depends only on the binary resolution of each pixel value (typically 8 or 10 bit). In U.S. Pat. No. 4,628,469, the divisor was a first sum of all the binary pixel values in the pulse, which can become quite large depending on the size of the pulse being measured.

Similarly the numerator is much reduced because it only involves first additions and subtractions rather than the potentially very large sum of sums.

The calculation can be readily accomplished at real time. After the lower threshold is exceeded every pixel is subtracted from an accumulator at pixel clock speed as it arrives until the peak x-intercept point is reached. After the peak x-intercept location, the accumulator switches to adding each pixel as it arrives until the lower threshold is crossed. The accumulator then holds the value (aa−bb).

By pipelining the division and posting it to a second logic block, the next (aa−bb) sum can be calculated while the division block is doing the single division necessary to finish the previous (aa−bb)/N calculation. This allows a full line time for doing the division and completing the rest of the calculation and can therefore be implemented in less costly logic.

One attribute of this method that may appear to be detrimental is the requirement that a peak must be found in order to find the x-intercept switch point and place an upper bound on the integral. However, in the context of a real-word system, there is a need to make the lower threshold as low as possible. The lower the value for the lower bound, the more data can be included in the pulse calculation and therefore the greater the sub-pixel accuracy.

Unfortunately reducing the lower threshold can cause background noise or secondary reflections to come into play in a real world system. The peak detector then stands alone as a necessity because it is used as a peak filter to extract the pulse with the highest peak from the forest of surrounding noise. The intent therefore is to drop the lower bound partially into the noise floor to get as much of the pulse data as possible and then apply the peak detector to extract the pulse with the highest peak.

All existing centroid calculation methods are readily applied to cases where the camera provides 1 pixel value per clock cycle in a serial data stream. However some of the newer high speed cameras provide 8 or 10 consecutive pixels from one row in one clock cycle. It becomes extremely difficult to calculate a sum of sums or similar calculation in real time when the data is presented in this method. For example second sums are easily calculated for serial data by a second accumulator that is keeping a running total of the intermediate sums provided by the first accumulator. For parallel data 8× clock speed summing hardware or other very costly hardware is necessary to maintain real time for this method.

However, the new equation presented above uses only first sums and first subtractions and could therefore be realized in much less costly logic and still run real time.

FIG. 11

The positive differential exceed indicator and negative differential exceed indicator are then merged. The merging involves processing to discard obvious rejects and combining to create gating pulses. Obvious rejects are two consecutive positive indicators or two consecutive negative indicators. Once the gating pulses have been created they are passed through the wide feature filter to remove all pulses that exceed the preset width.

The next step is to pass the remaining gated pulses through the differential peak extractor, which will extract the pulse with the largest differential. If there are two pulses of equal differential, then the first will be selected. The final gating pulse is then correlated with the raw binary data for the centroid calculation.

This method is very effective in extracting laser lines from images with a lot of ambient light variability throughout the field of view. For a future implementation with a larger altera, variable spacing between the two windows should be added.

4) Thresholds:

All thresholds are 8 bit. The least significant bits of the incoming 10 bit data stream will be ignored in the initial implementation. Individual manual threshold registers are available for each camera. Setting the appropriate bit switches to auto-threshold mode where these register values become offsets to the auto-threshold value.

Figure 10:
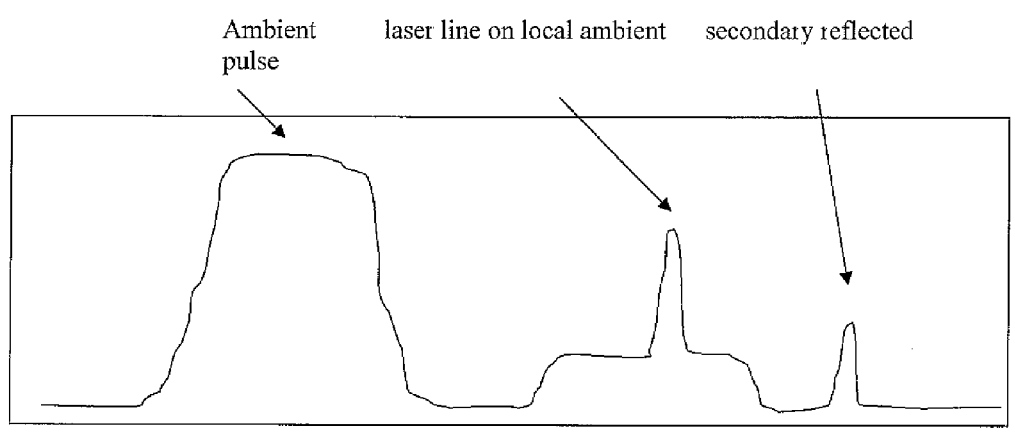
FIG. 10 is a trace depicting laser line and ambient pulses.
Figure 11:
FIG. 11 shows laser line profiles and corresponding differential indicators and gating pulses.
Figure 11:
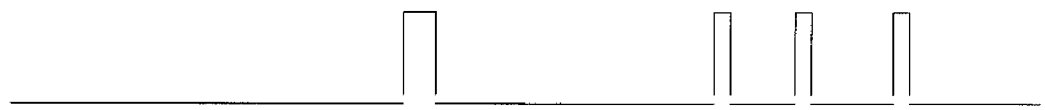
Figure 11:
Figure 11:
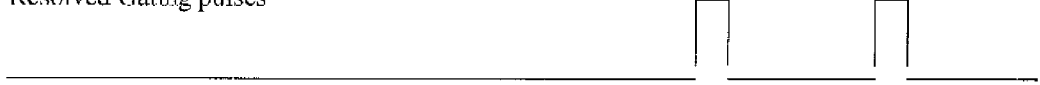
Figure 11:

AutoThreshold: Referring to FIG. 10, there are currently two variants on the auto-threshold.
a) Lowest Average 32 block—This version averages successive blocks of 32 pixels on a line and finds the lowest average block value. The threshold value is then added as an offset and the final value is used as the threshold for the next line. This method works well when the background has average uniformity or is lowest local to the laser line. The subsequent peak extraction filter will extract the largest peak from the surrounding noise. However, if there is a substantial average background increase local to the laser line then this method will not find the laser line, because the wide feature filter may remove it. Referring to FIG. 10, the second pulse will be detected rather than the taller first pulse.
b) Differential Sliding Window—This method slides two staggered averaging windows through the pixel data. The current pixel is compared against the local average values in both these adjacent windows. The leading window handles negative differentials. The trailing window handles positive differentials. The windows slide on a pixel by pixel basis and therefore the average changes locally thereby essentially calculating local backgrounds. The threshold value is then subtracted from the current pixel value and the result compared with the two windows. If the current pixel value>positive window avg+threshold value, then a positive differential indicator is set. If the current pixel value>negative window avg+threshold value, then a negative differential indicator is set. There are three window sizes available in the current altera (16 pixels, 8 pixels, 4 pixels).

Laser triangulation systems operate by acquiring a video image of a surface illuminated by a laser line. The location of the laser line in the video image represents the XY location of the surface. It is necessary to extract the centroid of the laser image on each video line to sub pixel resolution. Various algorithms are in use—see U.S. Pat. No. 5,164,579, issued Nov. 17, 1992 to Pryor et al.; U.S. Pat. No. 4,628,469, issued Dec. 9, 1986, to White; U.S. Pat. No. 5,812,269, issued Sep. 22, 1998, to Svetkoff et al., and Blais, Rioux, (zero crossing), all of which are incorporated herein by reference as though fully set forth, and which offer compromises between speed of execution and accuracy. All depend on a good quality video signal. The quality is dependent on:

incident laser light—power and x-beam symmetry
f/# of gathering optics to minimise speckle
surface quality—reflectance, angle, roughness
size of incident laser spot or line—minimise macro changes, maximise accuracy, maximise resolution.

During system operation, the surface properties (reflectance, roughness, tilt) typically vary within each scene or over the extent of the part under measurement. If there is too much signal return, then the signal is clipped at the peak and the centroid accuracy is compromised. Conversely, given too low a signal, the centroid is either not detected or the centroid calculation is based on a laser image a few pixels wide at low amplitude providing very poor accuracy.

Two typical applications illustrate the difficulty:
In a continuous inspection system profiling a complex extruded part, the near vertices may be over exposed and the far field in a dark crevice may be underexposed—there is no good compromise for exposure setting that provides good accuracy in the near field and adequate signal in the far field—the image is either under or over exposed (see, for example, FIGS. 2-4).

In a single part measurement, the surface color may change from very light to a dark absorbing finish. The exposure time must be adjusted to get good data in each instance.

There are two optimisation problems—one intrascene and one over time over many scenes.

This creates difficulty in system setup—a problem unique to static laser line generator systems. Flying spot scanners such as the Steinbichier Comet™, made by STEINBICHLER OPTOTECHNIK GmbH of Germany, use feedback control to control the intensity of each scanned point.

There are currently no known systems operating with real time feedback of 'centroid quality'. The only known system with some capability in this regard is the Romer Arm™ sensor (manufactured by Romer Inc. of Michigan) with color feedback in the centroid display to show signal amplitude to the user.

There is then a real requirement to determine the quality of the data for each point and use this data in a useful manner for system configuration in a dynamic fashion.

Centroid Generation

The centroid represents the sub pixel location of the laser line along each video line. The present implementation is based on a 640 pixel×480 line resolution camera and $1/16^{th}$ of a pixel resolution. Hence, the maximum centroid value possible is 640×16=10240 which can be contained within a 14 bit word—16,384—leaving 2 bits available for some form of tag or quality factor. If this is not deemed adequate, then a full 24 bit centroid 'word' is required to provide the base 14 bit centroid and an additional 10 bits of quality factor or tag data.

A number of pre processing steps are described and summarised below:

| Process | Operation | Application |
| --- | --- | --- |
| Min feature width rejection | Discards small features - either black or white below a user specified width - typically 1 or 2 pixels | Filters out noise due to dust removes effect of bad pixels Rejects ambient light artifacts, windows etc |
| Max feature rejection | Discards features wider than a certain width - typically 30 pixels | Compensates for variable background lighting |
| Dynamic threshold | Adjusts background threshold level on a moving average basis | |
| Peak Amplitude Detect | Detects maximum signal level on each line - or returns first saturated region - | Identifies best candidate for a valid centroid |
| Max Power Detect | Detects peak with maximum power level on each line | Identifies best candidate for a valid centroid |

The video data on each video line is then operated on to calculate the centroid value. In addition to the actual centroid value, various other parameters can be calculated as a measure of Centroid Quality.

Centroid Quality Criteria

These criteria are used as a measure of the centroid quality and are intended for use in the processing path.

One of the basic criteria can be encoded into the 2 bits available in the basic 16 bit centroid value.

If more than one of the basic criteria is required, or if extended criteria are used, then an extra byte must be assigned to the centroid value—for example for three bytes in total.

Amplitude

This returns the amplitude of the peak of the centroid.

This can be encoded into 2 bits of the centroid value by defining 2 levels in addition to the threshold level within the 0-255 range.

This is the simplest criteria to calculate but is subject to error in the presence of noise spikes. Pre-processing is intended to remove such spikes prior to centroid detection.

In a typical system the levels can be defined as:

| Level | Name |
| --- | --- |
| 11 | Threshold |
| 60 | Min |
| 200 | Max | with corresponding tags or quality factors assigned to centroids as follows:

| Tag (2 bit) | Name | Associated Criteria | Comments |
| --- | --- | --- | --- |
| 00 | Weak | Peak < Min | Accuracy may be suspect |
| 01 | Good | Min < Peak < Max | Optimum |
| 10 | Strong | Max < Peak < MAX_DEF | Should reduce exposure |
| 11 | Saturated | 255 < MAX_DEF | Over exposed, accuracy is suspect |

Base Width

This returns the width at the threshold height of the centroid. It is filtered to pass widths between the min and max feature settings.

If we assume a uniform laser beam, then this is a reasonable indication of centroid quality.

In a typical system the widths could be defined as:

| Width | Name |
| --- | --- |
| 3 | Low |
| 6 | Min |
| 12 | Max |
| 20 | Sat | with corresponding tags or quality factors assigned to centroids as follows:

| Tag (2 bit) | Name | Associated Criteria | Comments |
| --- | --- | --- | --- |
| 00 | Thin | Width < Low | Accuracy may be suspect |
| 01 | Narrow | Low < Width < Min | OK |
| 10 | Optimum | Min < Width < Max | Optimum |
| 11 | Wide | Max < Width < Sat | Should reduce exposure |

Symmetry

This returns a measure of the symmetry of the beam about the detected peak. It is useful as a criterion for selecting points where there is extreme slope or the spot straddles an edge.

It is calculated as the difference between the mid point of the base and the centroid This is a reasonably simple criterion to calculate. In a typical system the differences could be defined as:

| Diff | Name |
|---|---|
| 2 | Typical |
| 4 | Acceptable | with corresponding tags or quality factors assigned to centroids as follows:

| Tag (2 bit) | Name | Associated Criteria | Comments |
|---|---|---|---|
| 00 | Good | Diff < Typical | Symmetric - good |
| 01 | OK | Typical < Diff < Acceptable | OK - within limits for laser beam |
| 10 | Skewed | Acceptable < Diff | Skewed by surface feature - suspect |
| 11 | | | |

HPBW—Half Power Band Width

This returns the width at the half peak height of the centroid. It is a parameter commonly used to define optical bandpass filters.

This is not an easy criteria to calculate as the peak height must first be determined, the half height, and then the width at about this point.

In a typical system the levels could be defined as:

| Level | Name |
|---|---|
| 1 | Low |
| 2 | Min |
| 4 | Max |
| 8 | Sat | with corresponding tags or quality factors assigned to centroids as follows:

| Tag (2 bit) | Name | Associated Criteria | Comments |
|---|---|---|---|
| 00 | Thin | Width < Low | Accuracy may be suspect |
| 01 | Narrow | Low < Width < Min | OK |
| 10 | Optimum | Min < Width < Max | Optimum |
| 11 | Wide | Max < Width < Sat | Should reduce exposure |

Non Real Time Processing

The Host system can add some additional attributes to the centroid data stream based on the degree of continuity from video line to video line.

The input data stream is examined for centroid continuity across several user selected lines for centroids that exist within a user selected band of previous and next line values. This is useful to filter out single or double outliers for instance.

Real Time Processing

The real time uses consist of providing immediate feedback to the user to aid in setting up the system, and providing control inputs to automatic exposure and ranging algorithms operating in the system firmware and FPGA logic.

Display Attributes

This is the simplest use and can be exploited in several ways:

Color Coding

Referring to FIG. 4, the individual points in the Diagnostic Centroid display are color coded with typically Blue 240 indicating a low peak, Green mid to high range, and Red 210 saturated data.

Display Blanking

Individual points in the Centroid data are not displayed if these fall outside user specified levels.

Auto Exposure

The camera exposures and gain are adjusted to provide the best aggregate laser line response across the whole active window.

In the case of relatively uniform targets, there is typically an operating point (exposure and gain settings) which provides good data from all points illuminated by the laser line.

In the case of targets that show varying color, range, occlusions etc. any one setting cannot provide good results for all points. There is always a compromise to be made.

This is analogous to photography with an automatic camera where there are light and dark regions in the scene. The auto exposure system either provides the best compromise, or is instructed to use only a specific region for exposure setting, or the user disables the auto exposure feature and sets it manually, typically also taking additional exposures at a range of exposures around the 'first choice' to ensure at least one good shot.

Auto Exposure Banding

Auto Exposure Banding is intended to maximise the quality of the data from the whole surface. Given that most real surfaces produce a wide range of reflected signal intensities, there is no one operating point, even for a single profile, that can provide the best data.

For most real objects, the optimum scan exposure settings will vary over a wide range as the object is moved in relation to the sensor head, and indeed within each scan line as discussed above. Auto Exposure Banding addresses this problem by defining two or more exposure settings that the system automatically cycles through on successive scan lines. In this manner, the complete data set will contain at least one good data point in close proximity to the desired sample point on the surface, and in many cases more than one good point. Post acquisition filtering based on the quality factors can be performed on the complete data set to select the best data point set and/or to average good data points around the sample point of interest.

Auto Banding provides a means to ensure that a sufficient number of points on the surface are scanned at or close to their optimum operating point for good range measurement. Other points on the same scan may not be optimally exposed but the presence of quality factors allows these to be rejected in the surface reconstruction phase.

In the surface reconstruction process, all the data is assembled either as uniformly spaced planes or a cloud of XYZ data points, and combined in some form of triangulation process to produce a surface. If these input data points are 'tagged' with a quality factor such that only the best or valid points are included in the reconstruction process, then the resulting surface should be more accurate and complete.

Auto Banding provides the means to ensure that during data acquisition the full range of operating points are used to ensure that all points on the surface are sampled with close to optimum settings. This is in fact a form of oversampling, with the addition of quality factors so that an informed decision can be made as to which points are the most valid.

The technique can be used in its basic form, or with the addition of auto update to continuously adapt to varying surface conditions.

This technique is implemented in the following fashion:

The user sets an initial two or more exposure band settings (e.g. the min and max operating points) based on knowledge of the surface to be scanned, or a pre-scan.

Operating points between these two extremes are selected for a total of three or four points including the max and min typically, or if the points are at extreme separation the user can override the selection of these.

The operating point is moved in successive scans through the range of operating points in round robin fashion.

The quality of the data from all exposure bands can also be monitored and adjusted as necessary to ensure complete coverage of the object with good sample points.

The data quality from all scans is examined and the operating points adjusted using logic as follows:

For the lowest exposure*gain operating point, if there are overexposed points (beyond a user specified minimum), then the operating point is moved to a lower setting.

For the highest exposure*gain operating point, if there are under exposed points, then the operating point is moved to a higher setting.

Intermediate operating points are then adjusted to be uniformly spaced between the extremes.

Post Acquisition

Data Filtering

Data filtering is simply discarding points from the data set that are tagged outside the two central tag bands (for the 2-bit tag or quality factor examples discussed above). It is useful when reconstructing complete surfaces from multiple scans.

Data Selection

Data selection is applicable when two or more scans are overlapped, or close to overlapped. The same region on the surface will have been sampled by one or more sensors or cameras. If these sensors or cameras have different angles of view or spot size, then any differences in the quality of the data may not show in the base tags or quality factors, but could be noticeable in the extended tags or quality factors—for instance when measuring an inclined surface from two orthogonal directions (centroid symmetry), or moving over an edge with different spot sizes (centroid symmetry).

Coordinate System and Units of Measurement

Figure 12:
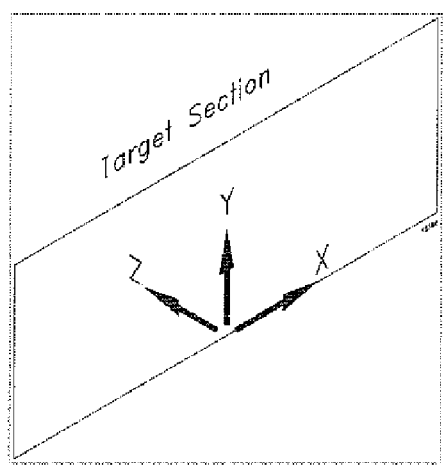
FIG. 12 depicts a right angle Cartesian coordinate system.

The Right Angle Cartesian coordinate system as shown in FIG. 12 is used.

The origin is defined as the mid point on the top surface of the belt or chain.

The object to be scanned travels in the Z direction through the Target Section which is defined by the plane of the laser line generators.

Baseline Imperial system: the unit of measurement in the X and Y axes is 0.001" (thousandths of an inch.) expressed as signed short integers for a measurement range of +/−32.7"

Baseline metric system: the unit of measurement in the X and Y axes is 0.01 mm (10 micron) expressed as signed 16 bit integers for a measurement range of +/−327 mm The unit of measurement in the Z axis is encoder ticks where one tick corresponds to the smallest quadrature increment.

Sensor Coordinate System

Figure 13:
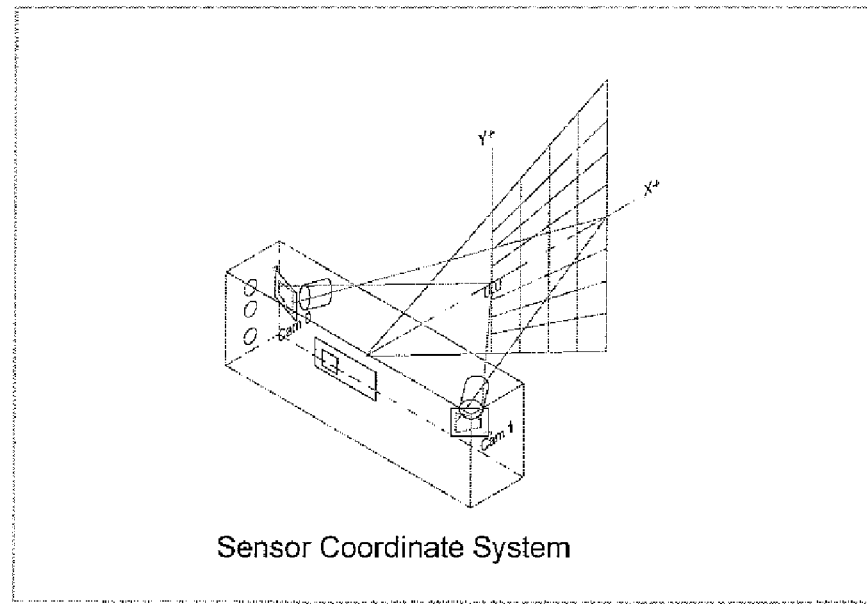
FIG. 13 depicts a sensor coordinate system.
Figure 14:
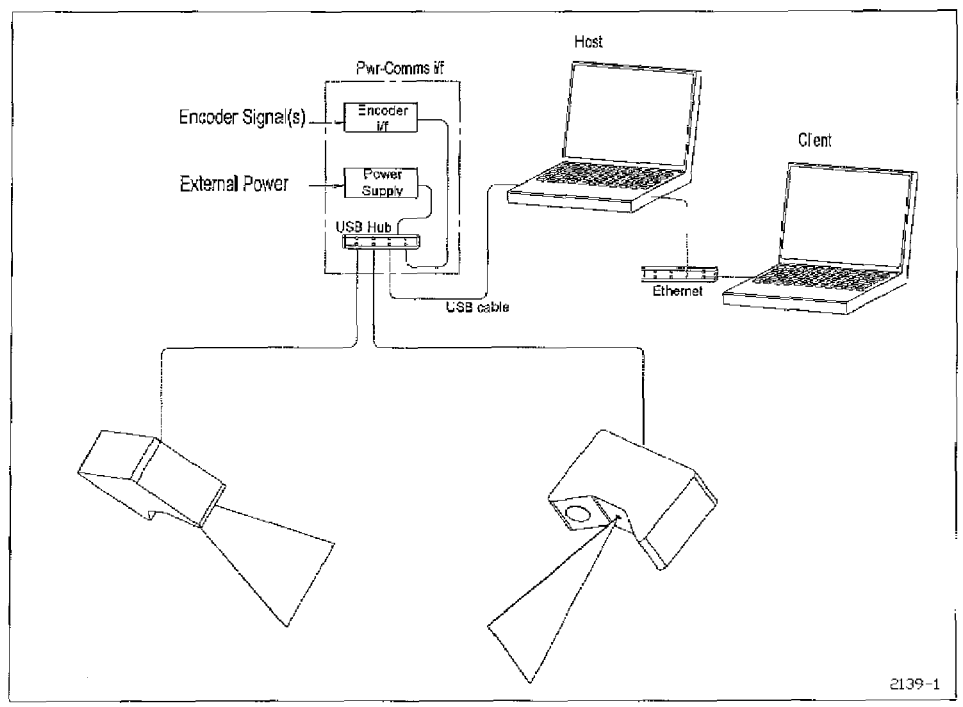
FIG. 14 depicts a Hydra USB™ installation, an example embodiment of the invention.
Figure 15:
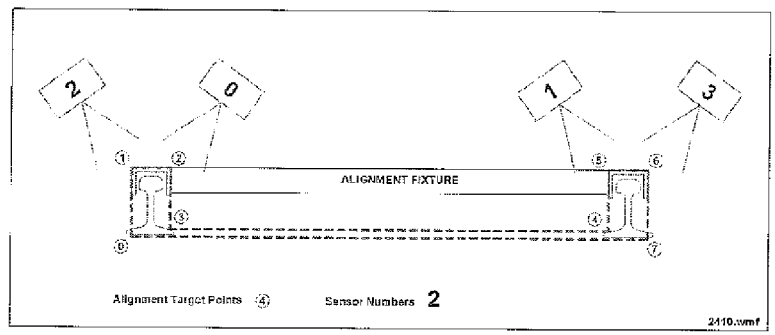
FIG. 15 shows sensors configured to examine both sides of a pair of railway rails.

The local coordinate system for each sensor head is defined below and shown in FIG. 13. This coordinate system is used for factory calibration.

Hardware

Sensor Head

In one embodiment, a sensor head comprises the following:

One or two CMOS cameras.
One or two laser line generators.
Optical body supporting the cameras and line generators.
PCB containing FPGA logic, microcontroller (e.g. EZ-USB by Cypress Semiconductor Corporation), and storage (e.g. EEPROM).
Overall Enclosure Power to the head is supplied at a nominal 5 vdc via USB cable conductors. The sensor heads require ~0.5 amp for two-camera versions which exceeds the USB specified maximum 0.5 amp draw from a USB port. Therefore modified USB hub and power supply assemblies can be used in this instance. All critical logic on the sensor head and the camera operate at 3.3 vdc Camera Assembly In one embodiment, each assembly consists of a printed circuit board (PCB), lens mount, lens and optical interference filter.

The PCB contains, for example, a monochrome Kodak KAC-0311 CMOS camera chip operated as follows:

640 lines×480 pixels—Window of interest to 32 lines by 256 pixels
Pixel clock rate 20 Mhz
8 bit digital video output Each camera PCB is connected directly to the FPGA logic on the main sensor head PCB.

The following camera parameters may be adjusted by 'core' configuration commands:

Window (WOI) of interest size and position
Horizontal line skipping—2×, 4×, 8×
Exposure time 0.1 to 32 ms
Analog gain 1×-8×
Compander ON/OFF (expands lower 32 levels×4, compresses upper 224)

These parameters are set over an $I^2C$ interface to the camera via commands that typically require several hundred μsecs to complete.

The camera acquires digital video data at frame rates dependent on the size of the WOI and exposure time.

Frame time is approximately the sum of exposure time+ (number of pixels/pixel clk freq)

Typical frame rates are 50 to 150 Hz.

Centroid data is generated and passed back to the 'core' at real time rates.

Gray scale video data requested by the core for diagnostic purposes is acquired over multiple frames and passed back at speeds determined by the available bandwidth—typically 0.5 Mbyte/s max The camera is operated in external sync mode with sync signals generated by the microcontroller and locked to a multiple of the Frame time.

The Lens Mount provides a rigid mount of the PCB, lens and interference filter to the optical body.

The Lens is a fixed focus, fixed aperture multi-element type threaded in to the lens mount. The focus is set at the factory and permanently locked. Different focal length lenses are used in different sensor head types.

The interference filter passes a narrow wavelength band centered on the laser color.

Laser Line Generator

In one embodiment, the laser line generator consists of a visible laser diode (nominal 670 nm), collimating and line forming optics.

Typical output power is 25 mw.

The laser is operated in pulsed mode with the pulse time matched to the camera exposure time.

Line fan angle and focus point are fixed per sensor head type and matched to the application. Fan angle lies in the range 15-808 full angle. Focus point in the range 2" to 200".

General Principles

The laser line preferably occupies a width of 6 to 16 pixels above the threshold width<6 does not provide best accuracy width>16 looses resolution perpendicular to the line This width is set by choice of optics, field of view, and laser assembly.

The threshold is preferably set to 20% above the general background and typically should be greater than or equal to the level of isolated background pockets.

The exposure is preferably set to the maximum for the application to minimise the effect of speckle. The maximum value is based on the following considerations:

Sample rate required—exposure+frame readout must be less than a value

'Long' exposures smear the data acquisition over a distance if the part or sensor is moving 'Long' exposures may produce too much exposure of the array The Gain is preferably adjusted to provide a laser line width close to 6 for detail work and close to 16 pixels for least noise consistent with:

No more than 5% of the laser line showing saturation—values>230

Typical values for the laser line peak pixel level in the range 60 to 160

Background levels<16 unless there is significant ambient interfering illumination—sunlight or incandescents Set Up Procedure Set up as above and then acquire video—

Look for highlights, flare and interior corners that may be causing problems.

Look for background sources that can be masked or turned off.

Poll centroids—noise and temporal jitter should be <+/−¼ pixel. Any higher indicates a problem.

Look for full coverage of the part in question—increase exposure (and then gain if necessary) to sacrifice accuracy in the highlights to acquire 'shadows' that are important.

Move the part further out in the field of view to minimise dynamic range in the image.

When satisfactory performance is achieved, settings can be written to an INI or configuration file.

The invention claimed is:

1. A method for measuring dimensions of an object, the method comprising the following steps:
    a) providing a sensor head having a laser line generator and a photodetector;
    b) projecting a line of laser light from said generator onto the object;
    c) detecting with said photodetector an image of said line reflected from the object;
    d) for each of a plurality of points in said image:
        i. generating a centroid;
        ii. generating a quality factor for said centroid, wherein said quality factor is indicative of a quality of said centroid; and
        iii. encoding said centroid and said quality factor in a centroid value;
    e) transmitting said centroid values from said sensor head;
    f) receiving said centroid values;
    g) decoding said centroid values into said centroids and said quality factors;
    h) comparing said quality factors to quality criteria;
    i) selecting from said centroids one or more selected centroids based on the comparison;
    j) for each selected centroid computing a range to the object.

2. The method according to claim 1, further comprising the following step: displaying a graphic representation of one or more of said ranges, said selected centroids, and said quality factors.

3. The method according to claim 2, wherein said graphic representation is an image of said object.

4. The method according to claim 1, wherein said quality factors are indicative of one of centroid amplitude, centroid base width, centroid symmetry, centroid half power band width and centroid continuity.

5. The method according to claim 1, wherein said quality criteria include maximum and minimum values of one of centroid amplitude, centroid base width, centroid symmetry, centroid half power band width and centroid continuity.

6. The method according to claim 1, wherein said quality criteria are one of user-defined and preset.

7. The method according to claim 1, further comprising the following step: varying one of a power of said line of laser light and an exposure of said image in response to said comparison of said quality factors to said quality criteria.

8. The method according to claim 1, wherein said line of laser light is generated by one of a static laser triangulation system and a dynamic laser triangulation system.

9. The method according to claim 1, wherein said centroid value is one of a 16 bit and a 24 bit value.

10. The method according to claim 9, wherein said centroid value is a 16 bit value and wherein said centroid is encoded in 14 bits and said quality factor is encoded in 2 bits of said centroid value.

11. A method for measuring dimensions of an object, the method comprising the following steps:
    a) providing a sensor head having a laser line generator and a photodetector;
    b) projecting onto the object a first line of laser light;
    c) detecting a first image of said first line reflected from the object;
    d) projecting onto the object a second line of laser light;
    e) detecting a second image of said second line reflected from the object;
    wherein said first and second images are reflected from substantially the same portion of the object;

f) for each of a plurality of points in said first image:
   i) generating a first centroid;
   ii) generating a first quality factor for said first centroid, wherein said first quality factor is indicative of a quality of said first centroid;
   iii) encoding said first centroid and said first quality factor in a first centroid value;
g) for each of a plurality of points in said second image:
   i) generating a second centroid;
   ii) generating a second quality factor for said second centroid, wherein said second quality factor is indicative of a quality of said second centroid;
   iii) encoding said second centroid and said second quality factor in a second centroid value;
wherein each one of said plurality of points in said first image corresponds to one of said plurality of points in said second image, such that each of said first centroid values corresponds to one of said second centroid values;
h) transmitting said first and second centroid values from said sensor head;
i) receiving said first and second centroid values;
j) decoding said first and second centroid values into said first and second centroids and said first and second quality factors;
k) comparing said first quality factors to said second quality factors;
l) selecting from said centroids one or more selected centroids based on the comparison of said quality factors;
m) for each selected centroid computing a range to the object.

12. The method according to claim 11, further comprising the following step: displaying a graphic representation of one or more of said ranges, said selected centroids, and said quality factors.

13. The method according to claim 12, wherein said graphic representation is an image of said object.

14. The method according to claim 11, wherein said quality factors are indicative of one of centroid amplitude, centroid base width, centroid symmetry, centroid half power band width and centroid continuity.

15. The method according to claim 11, wherein said lines of laser light are generated by one of a static laser triangulation system and a dynamic laser triangulation system.

16. The method according to claim 11, wherein said centroid values are one of 16 bit and 24 bit values.

17. The method according to claim 16, wherein said centroid values are 16 bit values and wherein said centroids are encoded in 14 bits and said quality factors are encoded in 2 bits of said centroid value.

18. The method according to claim 11, wherein an exposure of said second image is greater than an exposure of said first image.

19. The method according to claim 11, wherein a power of said second line of laser light is greater than a power of said first line of laser light.

20. The method according to claim 11, wherein said selected centroids are selected in of real time and post-acquisition processing.

21. The method according to claim 11, further comprising the step of comparing quality factors of said selected centroids to quality criteria.

22. The method according to claim 21, wherein said quality criteria are one of user-defined and preset.

23. A method for measuring dimensions of an object, the method comprising the following steps:
   a) providing a sensor head having a laser line generator and a photodetector;
   b) projecting a line of laser light from said generator onto the object;
   c) detecting with said photodetector an image of said line reflected from the object;
   d) for each of a plurality of points in said image:
      i. generating a centroid;
      ii. generating a quality factor for said centroid, wherein said quality factor is indicative of a quality of said centroid; and
      iii. encoding said centroid and said quality factor in a centroid value;
   e) transmitting said centroid values from said sensor head;
   f) receiving said centroid values;
   g) decoding said centroid values into said centroids and said quality factors;
   h) comparing said quality factors to quality criteria;
   i) for each centroid computing a range to the object; and
   j) displaying a graphic representation of one or more of said ranges, said centroids, and said quality factors.

24. The method according to claim 23, wherein said graphic representation is an image of said object.

25. The method according to claim 23, wherein said quality factors are indicative of one of centroid amplitude, centroid base width, centroid symmetry, centroid half power band width and centroid continuity.

26. The method according to claim 23, wherein said quality criteria include maximum and minimum values of one of centroid amplitude, centroid base width, centroid symmetry, centroid half power band width and centroid continuity.

27. The method according to claim 23, further comprising the following step: varying one of a power of said line of laser light and an exposure of said image in response to said comparison of said quality factors to said quality criteria.

28. The method according to claim 23, wherein said line of laser light is generated by one of a static laser triangulation system and a dynamic laser triangulation system.

29. The method according to claim 23, wherein said centroid value is one of a 16 bit and a 24 bit value.

30. The method according to claim 28, wherein said centroid value is a 16 bit value and wherein said centroid is encoded in 14 bits and said quality factor is encoded in 2 bits of said centroid value.

31. The method according to claim 23, wherein said image of said object is color coded, and wherein said colors are reflective of said quality factors.

32. The method according to claim 23, wherein said quality criteria are one of user-defined and preset.

33. A method for optimizing exposure in a laser triangulation system, the method comprising the following steps:
   a) providing a sensor head having a laser line generator and a photodetector;
   b) projecting a line of laser light from said generator onto the object;
   c) detecting with said photodetector an image of said line reflected from the object;
   d) for each of a plurality of points in said image:
      i. generating a centroid;
      ii. generating a quality factor for said centroid, wherein said quality factor is indicative of a quality of said centroid; and
      iii. encoding said centroid and said quality factor in a centroid value;
   e) transmitting said centroid values from said sensor head;

f) receiving said centroid values;
g) decoding said centroid values into said centroids and said quality factors;
h) comparing said quality factors to quality criteria;
i) varying one of a power of said line of laser light and an exposure of said image in response to said comparison of said quality factors to said quality criteria.

34. The method according to claim 33, further comprising the following step: for each centroid computing a range to the object.

35. The method according to claim 33, further comprising the following step: displaying a graphic representation of at least one of said centroids and said quality factors.

36. The method according to claim 35, wherein said graphic representation is an image of said object.

37. The method according to claim 33, wherein said quality factors are indicative of one of centroid amplitude, centroid base width, centroid symmetry, centroid half power band width and centroid continuity.

38. The method according to claim 33, wherein said quality criteria include maximum and minimum values of one of centroid amplitude, centroid base width, centroid symmetry, centroid half power band width and centroid continuity.

39. The method according to claim 33, wherein said line of laser light is generated by one of a static laser triangulation system and a dynamic laser triangulation system.

40. The method according to claim 33, wherein said centroid value is one of a 16 bit and a 24 bit value.

41. The method according to claim 40, wherein said centroid value is a 16 bit value and wherein said centroid is encoded in 14 bits and said quality factor is encoded in 2 bits of said centroid value.

42. The method according to claim 33, wherein said quality criteria are one of user-defined and preset.

* * * * *